D. W. NORTON.
REINFORCED STRUCTURE.
APPLICATION FILED JAN. 8, 1908.
901,551. Patented Oct. 20, 1908.
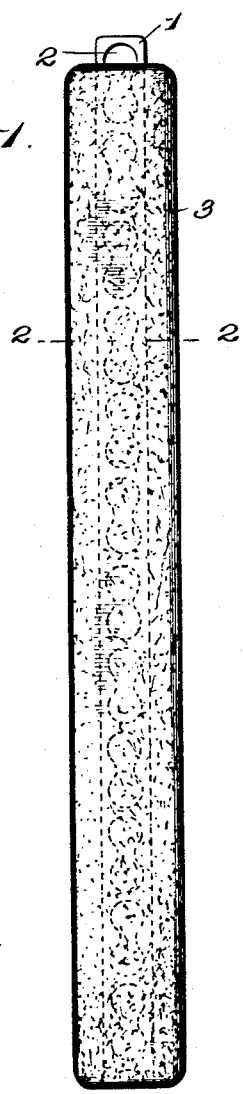
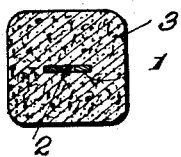
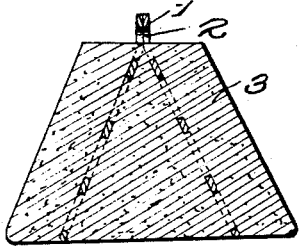
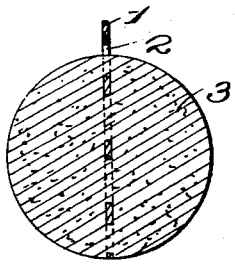
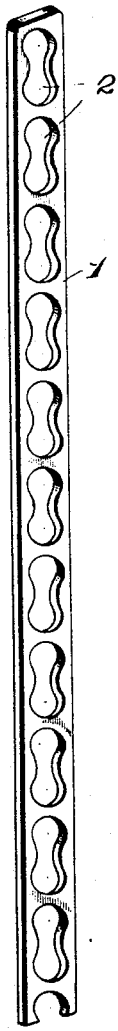
Witnesses
W. A. Williams
Inventor
D. W. Norton
By Dudley, Browne & Phelps.
Attorney

UNITED STATES PATENT OFFICE

DANIEL W. NORTON, OF VINCENNES, INDIANA.

REINFORCED STRUCTURE.

No. 901,551.      Specification of Letters Patent.      Patented Oct. 20, 1908.

Application filed January 8, 1908. Serial No. 409,743.

*To all whom it may concern:*

Be it known that I, DANIEL W. NORTON, a citizen of the United States, residing at Vincennes, in the county of Knox and State of Indiana, have invented certain new and useful Improvements in Reinforced Structures, of which the following is a specification.

This invention relates to certain new and useful improvements in reinforced concrete structures and it has for its object the production of a structure of this character which will be cheap to manufacture, and particularly adapted for the purposes for which it is designed.

Referring to the drawings wherein I show one form of my invention and wherein the same part is designated by the same reference numeral wherever it occurs Figure 1 is an elevation of one embodiment of my invention; Fig. 2 is a section taken on line 2—2 of Fig. 1; Fig. 3 is a perspective view of the preferred form of reinforcing bar; Fig. 4 is a side elevation of another form of weight, showing the employment of two reinforcing bars; Fig. 5 is a similar view showing still another form of weight.

1 designates the reinforcing bar provided with openings 2 therethrough. These openings may be of any desired shape and in the form shown they are the openings left by punching out the blanks by a chain making machine, so that the reinforcing bar is nothing more than a bar of scrap metal.

3 designates the body of the structure which is preferably formed of a mixture of iron or steel scales or cinders, or a mixture containing both iron and steel scales, or cinders, with cement, the scales or cinders having been previously pulverized.

I have shown my invention as applied to the manufacture of sash weights as one of the many uses to which the same may be put, and when so used the bar of scrap is so cut to form the reinforcing bar that at one end, the perforation is left as shown at the top of Fig. 1. This bar is then preferably supported in a mold and the mixture of cement and scale tamped around the same, leaving the perforation 2 at the end of the bar exposed as shown. By this means the cement mixture is caused to extend through the perforation in the bar 1, so that when the mixture has hardened the bar is firmly embedded and a strong and durable weight is produced.

The perforation 2 which is left exposed forms a loop by means of which the cord may be attached.

In Figs. 4 and 5 I show other forms of my structure. In Fig. 4 reinforcing bars are shown as placed at an angle to each other with their outer ends brought together so that the openings 2 in the ends of these bars coincide, through which the suspending cord or chain may be passed. In Fig. 5 I show a round or ball-shaped weight in which but a single reinforcing bar is used.

From the foregoing description it will be understood that while I have described my invention as applied to the manufacture of weights, the same is not to be limited to such construction, as it may be used for the production of any reinforced structure that may be desired.

While I have described what I believe to be the preferred form of my invention I desire to have it understood that many changes may be made in the form, construction and arrangements of parts without departing from the spirit thereof.

What I claim as new and desire to secure by Letters Patent is

1. An article of manufacture, a reinforced structure made from a cement mixture molded to the desired form and having embedded therein a bar extending substantially through said structure, said bar being provided with perforations throughout its length through which perforations the cement mixture extends whereby the bar is keyed in place and having one of said perforations extending beyond the end of the structure and adapted to receive a suspending cord.

2. An article of manufacture, a reinforced structure made from a mixture of steel or iron scales and a binder molded to the desired form and having embedded therein a perforated bar through the openings in which the material extends, whereby said bar is keyed in place, and having one of said perforations extending beyond the end of the structure and adapted to receive a suspending cord.

In testimony whereof I affix my signature in presence of two witnesses.

DANIEL W. NORTON.

Witnesses:
     W. A. CULLOP,
     C. M. GILMORE.